W. F. COLLIER.
Table-Caster.
No. 161,933. Patented April 13, 1875.
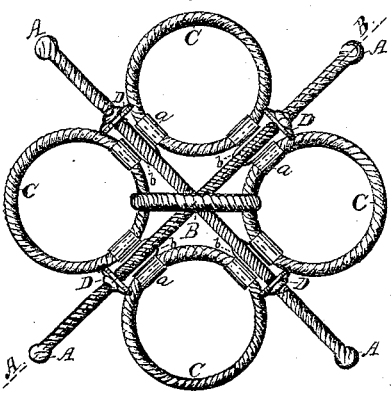
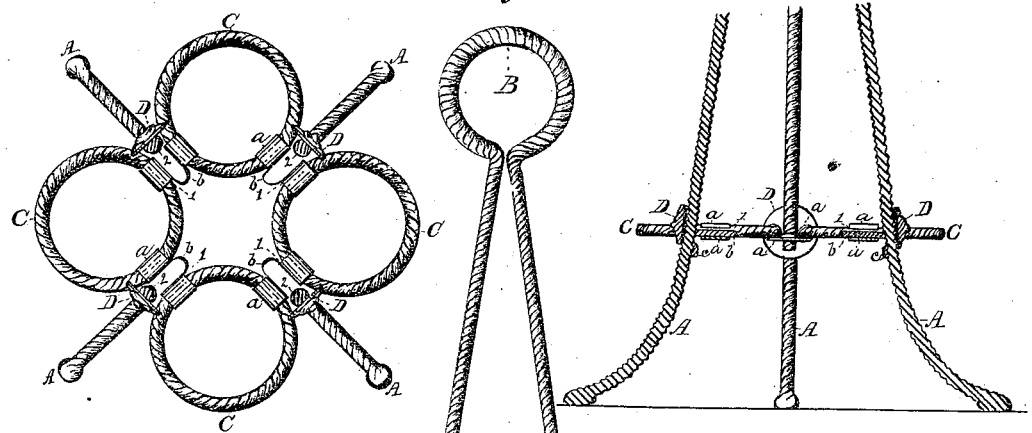
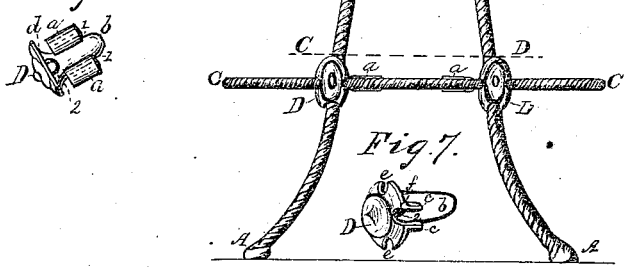
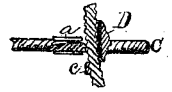
Witnesses:
Thos. H. Dodge
Edwin C. Moore
Inventor:
William F. Collier

UNITED STATES PATENT OFFICE.

WILLIAM F. COLLIER, OF WORCESTER, MASSACHUSETTS.

IMPROVEMENT IN TABLE-CASTERS.

Specification forming part of Letters Patent No. 161,933, dated April 13, 1875; application filed February 6, 1875.

*To all whom it may concern:*

Be it known that I, WILLIAM F. COLLIER, of the city and county of Worcester and Commonwealth of Massachusetts, have invented certain new and useful Improvements in Table-Casters; and I do hereby declare that the following is a full, clear, and exact description of the same, reference being had to the accompanying drawings, forming a part of this specification, and in which—

Figure 1 represents a top or plan view of my improved table-caster. Fig. 2 represents a side view of the same. Fig. 3 represents a vertical central section of the lower part of the caster, on line A B, Fig. 1. Fig. 4 represents a cross-section on the line C D, Fig. 2. Figs. 5, 6, and 7, represent parts of the caster, as will be hereafter more fully explained.

To enable those skilled in the art to which my invention belongs to make and use the same, I will proceed to describe it more in detail.

The object of my present invention is to produce a table-caster which is not only ornamental and strong, but which can be made and put together very quickly and accurately, and also, when desired, can be taken apart to be packed for transportation or storage, as will be hereafter explained.

In the drawings, the parts marked A constitute the legs and supporting-frame work of the caster, and which legs or frame-work are formed, in this instance, of twisted wire—all four of the legs being twisted together to form the ring or handle B. The bottle-rings C are made separately, and are connected together by clamping-pieces $a$, the ends 1 of the clamping-pieces $a$ being bent over their respective rings, as shown in the drawings. Rosette tongue-pieces D are secured to the legs A, after the legs have been passed through holes 2 in the base of the tongues $b$, and between the lugs or ear-pieces $c$. By bending or forcing said lugs $c$ down firmly upon the inside of the legs so as to clamp the legs firmly between the ear-pieces $c$ and the inside of the rosette part $d$, a secure connection is obtained. The constructor, after making the wire into the form desired for the legs and handle B, can apply and secure the rosette tongue-pieces D very quickly and very accurately to the legs, as above described, since he has only to employ a gage to enable him to set or clamp the tongue-pieces to the legs of the caster at a uniform distance from the ends thereof. After the bottle-rings C have been secured together by means of the clamp-pieces $a$, and the rosette-pieces have been secured to the legs of the caster, the rings and legs are secured together by springing out the legs so that the tongues $b$ can be slipped between the bottle-rings and in over the bottom part of the clamp-pieces $a$, and under the ends 1 thereof, as indicated in the drawings, after which the tongues can be securely fastened in place by a little solder, or the whole of the lower part of the caster can be dipped into molten tin, and the parts firmly united in that way. The rosettes D are made with three notches or openings, $e$, $e$, and $f$—the bottle-rings fitting into the notches $e$ $e$, while the legs A fit into the notches $f$. By this arrangement the rings have a double support, while the legs are rendered more rigid and less liable to spring out of place. It will be observed that the construction of my improved caster is such that the work can be systematized. For instance, one man can make the wire, another the frame, another the bottle-rings, another fasten the bottle-rings together by means of the clamping-plates $a$, another secure the rosette tongue-pieces to the legs, while another can unite and fasten the parts together to form a complete caster. Or, one man may first complete a large quantity of parts necessary to form the caster, and then unite them together in the order above indicated. Then again, if desired, the bottle-rings may be made and then secured together by means of the clamping-plates $a$, and the rosette-tongues secured in proper position upon the legs A, after which the rings may be packed in a box so as to occupy comparatively little space, while the legs of the frames can be sprung together, so that the frames can be packed together for boxing, in like manner, with great economy of space.

The rosette tongue-pieces D I prefer to make of some cast metal, and of the form shown in Fig. 7, since, when so made, it requires but very little work to finish them for use—the boring of the holes for the legs A and a little smoothing being all that is necessary.

Fig. 5 shows a perspective view of the tongue-piece, with a clamping-piece, *a*, arranged in the relative position which it occupies in the caster—the other parts being removed—and in Fig. 6 a vertical section is shown of one of the legs, rosette-tongues, and clamping-piece, while in Fig. 7 is shown a perspective view of the rosette tongue-piece before it has been secured to the leg of the caster.

Having described my improved table-caster, what I claim therein as new and as of my invention, and desire to secure by Letters Patent, is—

1. The combination, with the ring or handle B, legs A, bottle-rings C, and clamping-plates *a*, of the separate and independent combined rosette and tongue-pieces D, substantially as and for the purposes set forth.

2. The combined rosette and tongue-piece D, provided with a hole, 2, and consisting of the tongue marked *b*, ears *c*, and notched rosette *d*, substantially as shown and described, and for the purposes set forth.

3. The combination, with the bottle-rings C, clamping-plates *a*, and legs A, of the separate and independent connecting-tongues *b*, substantially as and for the purposes set forth.

WILLIAM F. COLLIER.

Witnesses:
   THOS. H. DODGE,
   EDWIN C. MOORE.